US007843166B2

(12) United States Patent  (10) Patent No.: US 7,843,166 B2
Shimada et al.  (45) Date of Patent: Nov. 30, 2010

(54) ALTERNATING-CURRENT POWER SUPPLY DEVICE RECOVERING MAGNETIC ENERGY

(75) Inventors: Ryuichi Shimada, Tokyo (JP); Hideo Sumitani, Tokyo (JP); Taku Takaku, Tokyo (JP); Takanori Isobe, Tokyo (JP)

(73) Assignee: MERSTech, Inc. (JP)

( * ) Notice: Subject to any disclaimer, the term of this patent is extended or adjusted under 35 U.S.C. 154(b) by 0 days.

(21) Appl. No.: 12/490,253

(22) Filed: Jun. 23, 2009

(65) Prior Publication Data

US 2009/0251114 A1  Oct. 8, 2009

Related U.S. Application Data

(63) Continuation of application No. 11/579,940, filed on Nov. 8, 2006, now abandoned.

(30) Foreign Application Priority Data

May 12, 2004 (WO) ................. PCT/JP2004/006674

(51) Int. Cl.
  *H02J 7/00* (2006.01)
  *H02J 7/04* (2006.01)
(52) U.S. Cl. ....................... 320/108; 320/128; 320/166; 307/65; 307/67
(58) Field of Classification Search ................. 320/108, 320/128, 104, 123, 163, 164, 142, 145, 141, 320/140, 137; 307/65, 66, 67, 64
  See application file for complete search history.

(56) References Cited

U.S. PATENT DOCUMENTS 5,736,832 A * 4/1998 Seragnoli .................... 320/128

(Continued)

FOREIGN PATENT DOCUMENTS

JP  01 217887 A  8/1989

(Continued)

OTHER PUBLICATIONS

European Patent Office Search Report dated Apr. 29, 2010 for counterpart application EP 09172314.8.

*Primary Examiner*—Edward Tso
*Assistant Examiner*—Alexis Boateng
(74) *Attorney, Agent, or Firm*—International Knowledge Asset Office

(57) ABSTRACT

The present invention relates to an alternating-current power supply device which can improve a power factor of an alternating-current load, realizes low cost and miniaturization, and recovers magnetic energy. The alternating-current power supply device includes a bridge circuit composed of four reverse conducting semiconductor switches, a capacitor that is connected between direct-current terminals of the bridge circuit and absorbs the magnetic energy at the time of cutting off the current, an alternating-current voltage source that is connected to the induction load in series and is inserted between alternating-current terminals of the bridge circuit, and a control circuit that gives a control signal to gates of the respective reverse conducting semiconductor switches and controls on/off states of the respective reverse conducting semiconductor switches. The control circuit simultaneously controls the on/off operation of the paired reverse conducting semiconductor switches positioned on a diagonal line of the four reverse conducting semiconductor switches composing the bridge circuit, makes a control so that when one pair of the two pairs is ON, the other pair is OFF, and switches the control signal in synchronization with a voltage of the alternating-current voltage source.

2 Claims, 5 Drawing Sheets

U.S. PATENT DOCUMENTS

| | | | |
|---|---|---|---|
| 5,907,223 A * | 5/1999 | Gu et al. | 315/247 |
| 5,933,338 A * | 8/1999 | Wallace | 363/61 |
| 6,049,188 A | 4/2000 | Smith | |
| 6,100,663 A * | 8/2000 | Boys et al. | 320/108 |
| 6,160,374 A * | 12/2000 | Hayes et al. | 320/108 |
| 6,548,985 B1 * | 4/2003 | Hayes et al. | 320/108 |
| 6,683,438 B2 * | 1/2004 | Park et al. | 320/108 |
| 6,844,702 B2 * | 1/2005 | Giannopoulos et al. | 320/108 |
| 7,005,759 B2 * | 2/2006 | Ying et al. | 307/64 |
| 2001/0054881 A1 * | 12/2001 | Watanabe | 320/166 |
| 2004/0189251 A1 * | 9/2004 | Kutkut et al. | 320/128 |

FOREIGN PATENT DOCUMENTS

| | | |
|---|---|---|
| JP | 04 337291 A | 11/1992 |
| JP | 9-28038 A | 1/1997 |
| JP | 9-219987 A | 8/1997 |
| JP | 10-136649 A | 5/1998 |
| JP | 2000 358359 A | 12/2000 |
| JP | 2000-358359 A | 12/2000 |

\* cited by examiner

CURRENT AND VOLTAGE WAVEFORM OF ALTERNATING-CURRENT CONTROL

COMPARISON BETWEEN THE CASES WHERE SWITCH IS ADOPTED
AND IS NOT ADOPTED (a)··· COIL VOLTAGE WAVEFORM (b)··· POWER SOURCE VOLTAGE WAVEFORM (c)··· CURRENT WAVEFORM WHEREIN SWITCH IS DOPTED (d)··· CURRENT WAVEFORM WHEREIN SWITCH IS NOT ADOPTED

ALTERNATING-CURRENT POWER SUPPLY DEVICE RECOVERING MAGNETIC ENERGY

BACKGROUND OF THE INVENTION

1. Field of the Invention

The present invention relates to an alternating-current power supply device that can improve a power factor of alternating-current load. More specifically, the invention relates to the alternating-current power supply device where a bi-directional magnetic energy recovery switch is inserted in series with the alternating-current load so as to function as a phase advancing capacitor instead of a conventional phase advancing capacitor and low-cost and miniaturization are realized.

2. Description of the Related Art

In the case where an alternating current is applied to an inductive load, it is necessary to apply a voltage higher than that of a direct-current resistance (resistance voltage at stationary state) at the time of start-up, and thus a power factor becomes poor due to a delay of a phase of current.

However, in order to improve the power factor of the alternating current, a phase advancing capacitor is inserted in series so that reactance is reduced, and the current is increased.

The improvement of the power factor by inserting the phase advancing capacitor in series is not suitable for the case where the power factor of the load changes according to an operating state or a circuit where a frequency of power source greatly changes.

On the other hand, the power factor of the load changes at the time from the start-up to the stationary operation like induction motors. In order to compensate this, however, an inverter-converter set of AC-DC-AC link using a semiconductor switch is used, and thus a frequency and a voltage are reduced at the time of start-up and the number of revolution is controlled at the time of operation. However, since the cost is high, harmonics distortion occurs due to PWM control and a large electrolytic capacitor is necessary for maintaining a DC voltage, the entire size becomes large.

At the time of the start-up of the induction motor, an inductance component is large, the power factor of the current is poor, and an active current is low. For this reason, a large torque (starting torque) cannot be obtained at the time of start-up.

Such a conventional method of improving the power factor has a limitation, and thus an alternating-current power supply device which has a power factor improving circuit instead of using the phase advancing capacitor and realizes low cost and miniaturization is requested.

SUMMARY OF THE INVENTION

The present invention is devised in order to solve the above problems, and its object is to provide an alternating-current power supply device which can improve a power factor of an alternating-current load and realizes low cost and miniaturization.

The inventors of this application give attention to that magnetic energy remaining in a circuit in the case where a load current is cut off is absorbed by the capacitor, the energy is recovered to the load at next ON time and the current is quickly raised so that the power factor can be improved. That is to say, the magnetic energy is absorbed by the capacitor so as to be stopped at the time of cutting off the current and the magnetic energy is recovered to the load at next ON time so that the current quickly rises. For this reason, the applied current increases, and thus the higher current can be applied to the load by a lower voltage, so that the power factor of the power source is improved in the general meaning.

A bi-directional magnetic energy recovery switch is, therefore, used in an alternating-current circuit so as to cut off the current at arbitrary timing, the magnetic energy is absorbed by a capacitor and the current is recovered to the load in an opposite direction at the arbitrary timing. As a result, alternating-current phase can be forcibly controlled.

The bi-directional magnetic energy recovery switch is a loss-free current switch which stores the magnetic energy remaining in the circuit in the case of cutting off the load current into the capacitor, and recovers the energy to the load at next ON time so as to quickly raise the current. A patent application about this switch has been already filed by the applicants of this application (Japanese Patent Application Laid-Open No. 2000-358359).

The present invention relates to an alternating-current power supply device which can improve the power factor of the alternating-current load, and an object of the present invention is to provide the alternating-current power supply device which supplies the alternating current to an induction load and recovers the magnetic energy at the time of cutting off the current so as to utilizes it as an current to be supplied to the induction load. The alternating-current power supply device comprises: a bridge circuit composed of four reverse conducting semiconductor switches; a capacitor that is connected between direct-current terminals of the bridge circuit and stores the magnetic energy at the time of cutting off the current; an alternating-current voltage source that is connected to the induction load in series and is inserted between alternating-current terminals of the bridge circuit; and a control circuit that gives a control signal to gates of the respective reverse conducting semiconductor switches and controls on/off states of the respective reverse conducting semiconductor switches. The control circuit simultaneously controls the on/off operation of the paired reverse conducting semiconductor switches positioned on a diagonal line of the four reverse conducting semiconductor switches composing the bridge circuit, makes a control so that when one pair of the two pairs is ON, the other pair is OFF, and switches the control signal in synchronization with a voltage of the alternating-current voltage source.

DESCRIPTION OF THE PREFERRED EMBODIMENT

In the present invention, in order to provide an alternating-current power supply device that is simply composed, miniaturized and low-cost, a pulse current generating function of a bi-directional magnetic energy recovery switch inserted between an alternating-current voltage source and an induction load is used for an ON/OFF operation at timing in synchronization with the voltage source, so that a phase of the alternating current can be controlled. This is explained in detail below with reference to the drawings.

Figure 1:
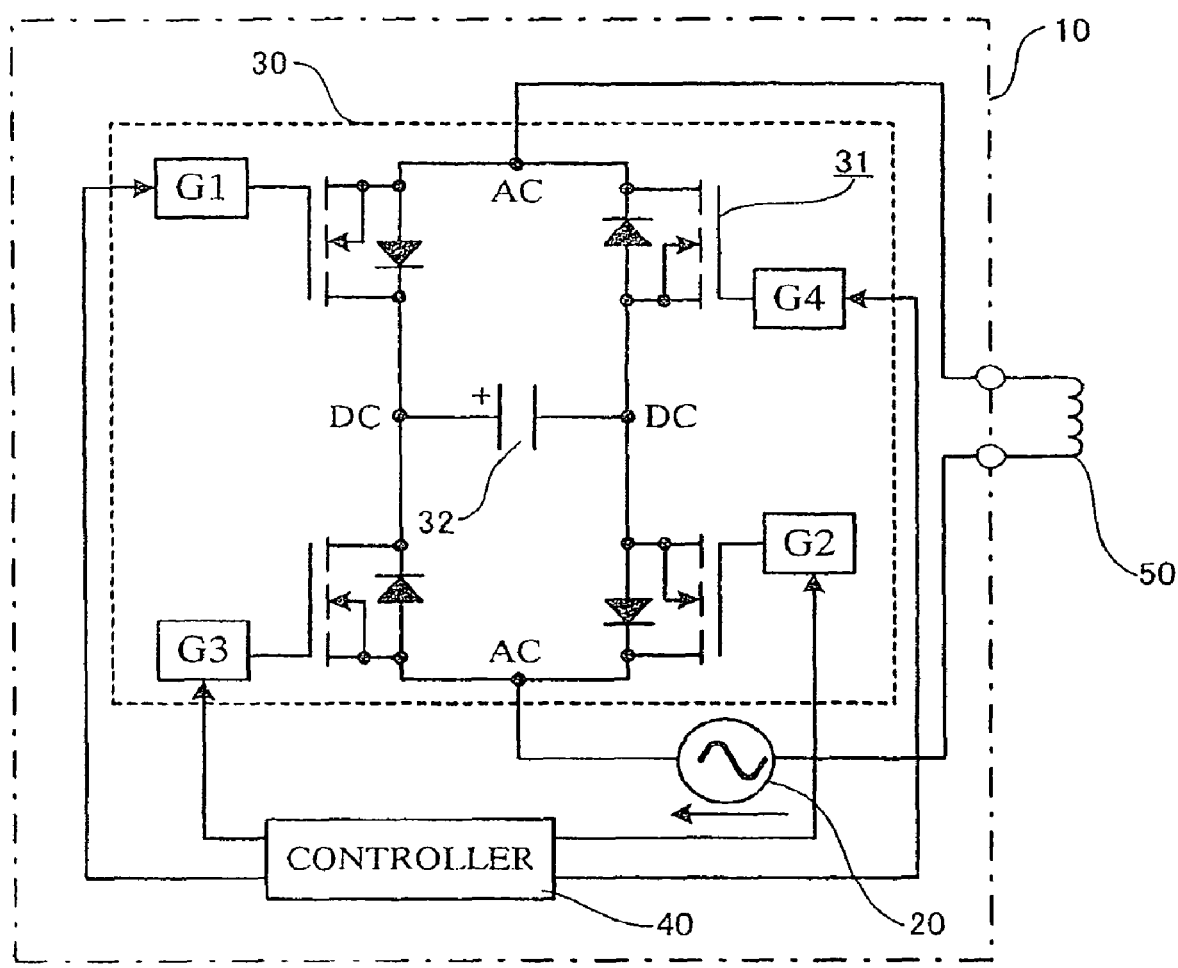
FIG. 1 is a diagram illustrating an alternating-current power supply device according to an embodiment of the present invention.

FIG. 1 is a diagram illustrating a basic constitution of an alternating-current power supply device 10 according to the present invention. A bi-directional magnetic energy recovery switch 30 (which is constituted by bridge-connecting four reverse conducting semiconductor switches 31) is inserted between an alternating-current voltage source 20 and an induction load 50 having an inductance, and a controller 40 controls respective gates (G1 to G4) of power MOSFET31 (one example of the reverse conducting semiconductor switches) using a signal which synchronizes with the voltage of the alternating-current voltage source 20 so that the current is turned ON/OFF.

Since the bi-directional magnetic energy recovery switch 30 contains a capacitor 32 for storing magnetic energy at the time of cutting off the current, the current which is the same as that at the time of cutting-off can be recovered by discharging by the capacitor 32 at next ON time.

A pulse type voltage is applied to the induction load 50 at the time of ON/OFF of the current, but the level of the voltage can be set within a withstand voltage of power MOSFET31 and the induction load 50 by selecting electrostatic capacity of the capacitor 32. In the end, however, a direct-current capacitor can be used differently from conventional series capacitors for improving a power factor.

The controller 40 controls the four gates of power MOSFET31, but a pair of the opposed gates, namely, the pair (G1 and G2) of a forward direction current or the pair (G3 and G4) in a reverse direction may be brought into ON/OFF state according to a direction to which the current is applied. It is, however, necessary to take care that the pair in the forward direction current and the pair in the reverse direction are not simultaneously brought into the ON state while the capacitor 32 has voltage.

The gate control is made in synchronization with the voltage of the alternating-current voltage source 20, but in the example of the case where, for example, the power factor of the current is improved, the gates (G1 and G2) in the forward direction are brought into the ON state while the voltage is positive, and the gates (G3 and G4) in the reverse direction are brought into the ON state while the voltage is negative. As a result, the current whose direction is the completely the same as the voltage is applied. And the switch lets the capacitor 32 charge the magnetic energy at the time of cutting-off the current and discharge the energy to the opposite direction, so that the current is quickly allowed to rise and the current supplied to the load is increased. A relationship between the voltage of the alternating-current voltage source 20 and the states of the gates are as shown in the following table 1.

TABLE 1

| Gate | AC voltage source | |
|---|---|---|
| | positive | negative |
| G1, G2 | ON | OFF |
| G3, G4 | OFF | ON |

Figure 5:
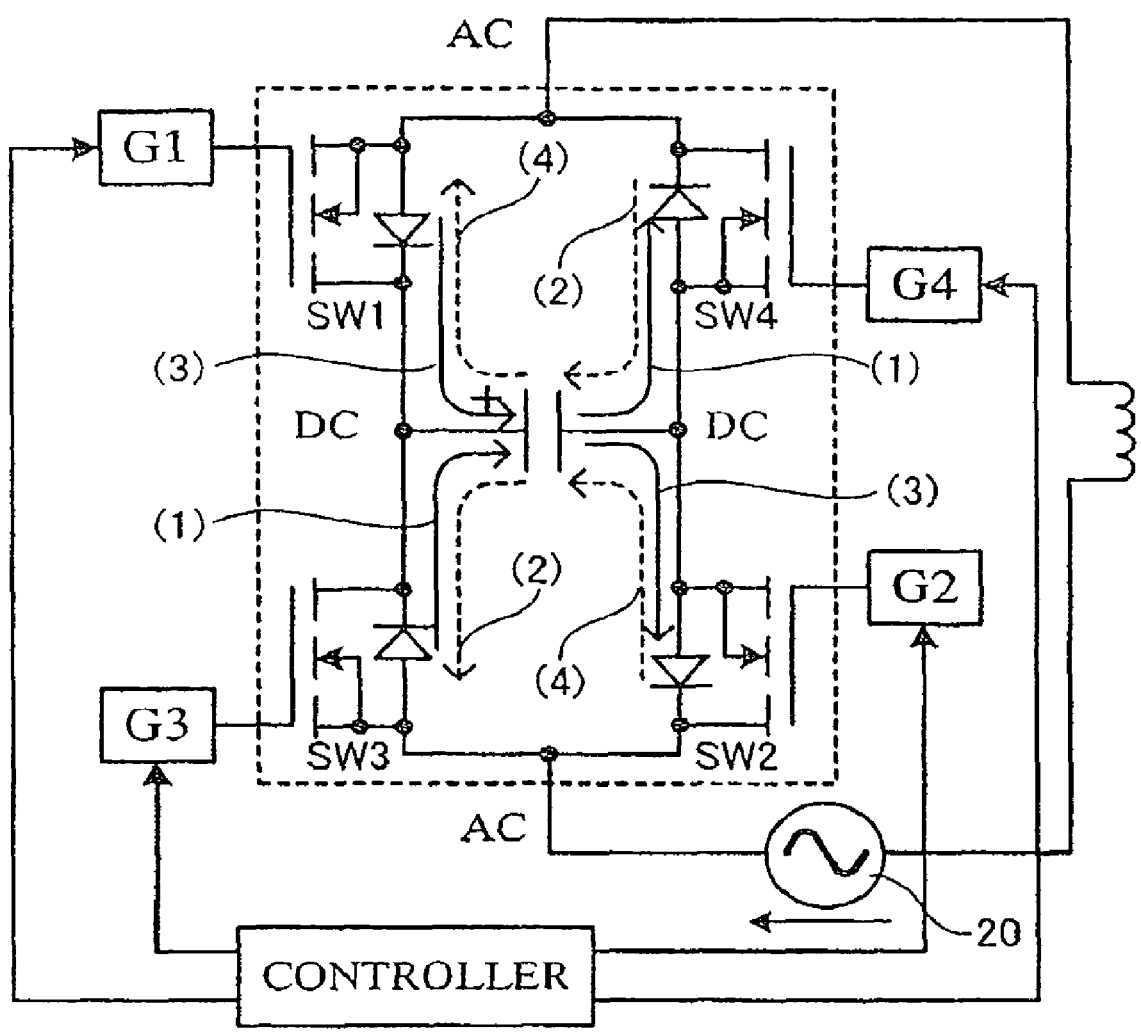
FIG. 5 is a diagram for explaining operation principle of a bi-directional magnetic energy recovery switch in the alternating current.

An operating principle of the bi-directional magnetic energy recovery switch in the alternating current is explained below with reference to FIG. 5.

Figure 2:
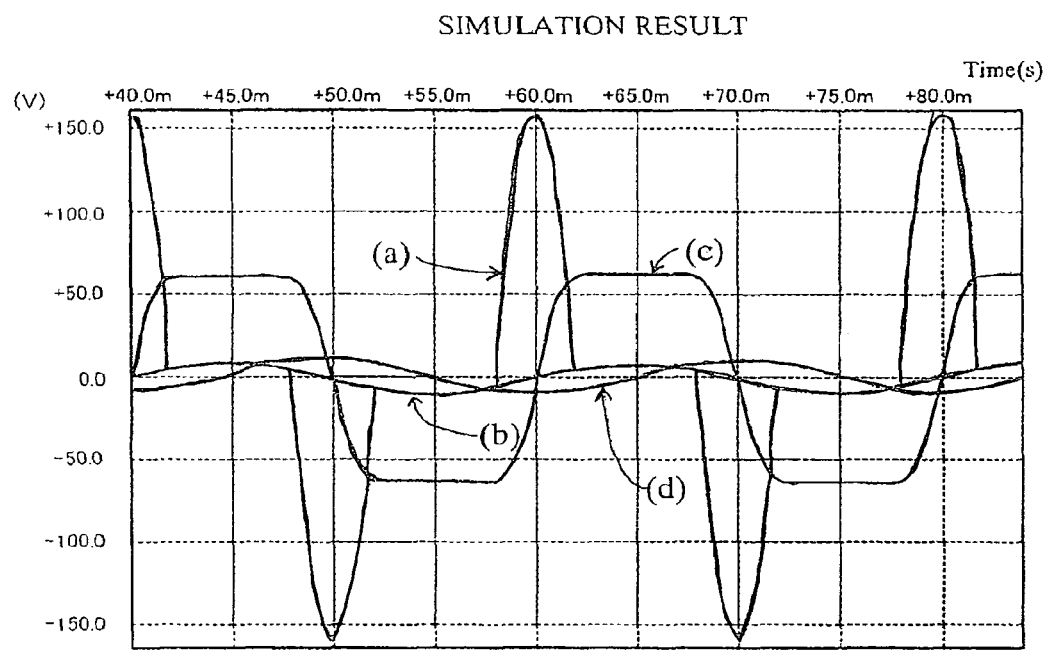
FIG. 2 is a diagram illustrating a simulation result of a current-voltage waveform of the alternating-current power supply device according to the present invention.

(1) The current flows from down to up (positive direction) while SW1 and SW2 are ON, and a two parallel conducting state is obtained (where the current is flat in FIG. 2).

(2) When the SW1 and SW2 are turned off just before the voltage of the alternating-current voltage source 20 is reversed from positive to negative (in this embodiment, before about 2 ms) (at this time, SW3 and SW4 are turned on), the capacitor is charged with the magnetic energy through the route (1).

(3) When the charging is completed, the current is cut off, and when the voltage reverses in polarity (positive→negative), the discharge is started through the route (2) (the current flows from up to down) because the SW3 and SW4 have been already turned on. When the discharge is completed, the two parallel conducting state is obtained.

(4) When SW3 and SW4 are turned off just before the voltage of the alternating-current voltage source 20 reverses in polarity from negative to positive (in this embodiment, about 2 ms) (at this time, SW1 and SW2 are turned on), the capacitor is charged with the magnetic energy through the route (3).

(5) When the charging is completed, the current is cut off, and when the voltage reverses in polarity (negative→positive), the discharge is started through the route (4) because SW1 and SW2 have been already turned on (the current flows from down to up). When the discharge is completed, the two parallel conducting state is obtained, and the state is returned to (1). The above cycle is repeated hereinafter.

The magnetic energy remaining in the circuit when the load current is cut off is absorbed by the capacitor, and the energy is recovered to the load at next ON time so that the current is quickly raised. As a result, the power factor can be improved.

FIG. 2 is a diagram illustrating an operating simulation result of the alternating-current power supply device according to the present invention. In the case where the bi-directional magnetic energy recovery switch 30 is adopted, it is found that the phase of the current is the same as that of the voltage and thus the current increases. This means nothing else that the power factor of the load is improved, and thus this device functions as one for improving power factor in the general meaning.

When the phase of the gate signal is further advanced, the current whose phase advances flows, and when the phase of the gate signal is delayed, the current can be reduced. The phase of the gate signal is delayed by 180°, the current is stopped.

The explanation about the embodiment of the reverse conducting semiconductor switch with the power MOSFET is done, but also when a reverse conducting GTO thyristor or a unit composed of parallel connection between a diode and a semiconductor switch such as IGBT is used, the same effect can be produced.

INDUSTRIAL APPLICABILITY

According to the alternating-current power supply device which recovers the magnetic energy in the present invention, the phase of the current can be forcibly synchronized with the phase of the power voltage source. For this reason, the power factor of the current can be improved, and thus the alternating-current power supply device whose size is smaller and whose cost is lower than conventional devices adopting the DC link system can be realized.

Figure 3:
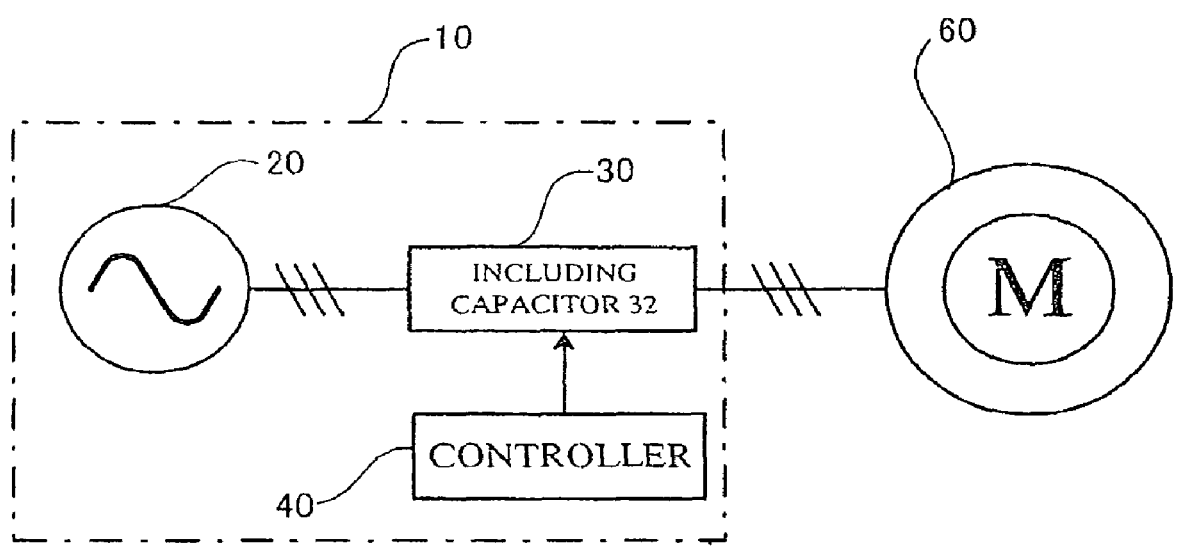
FIG. 3 is a diagram illustrating an application example of the alternating-current power supply device to an induction motor according to the present invention.
Figure 4:
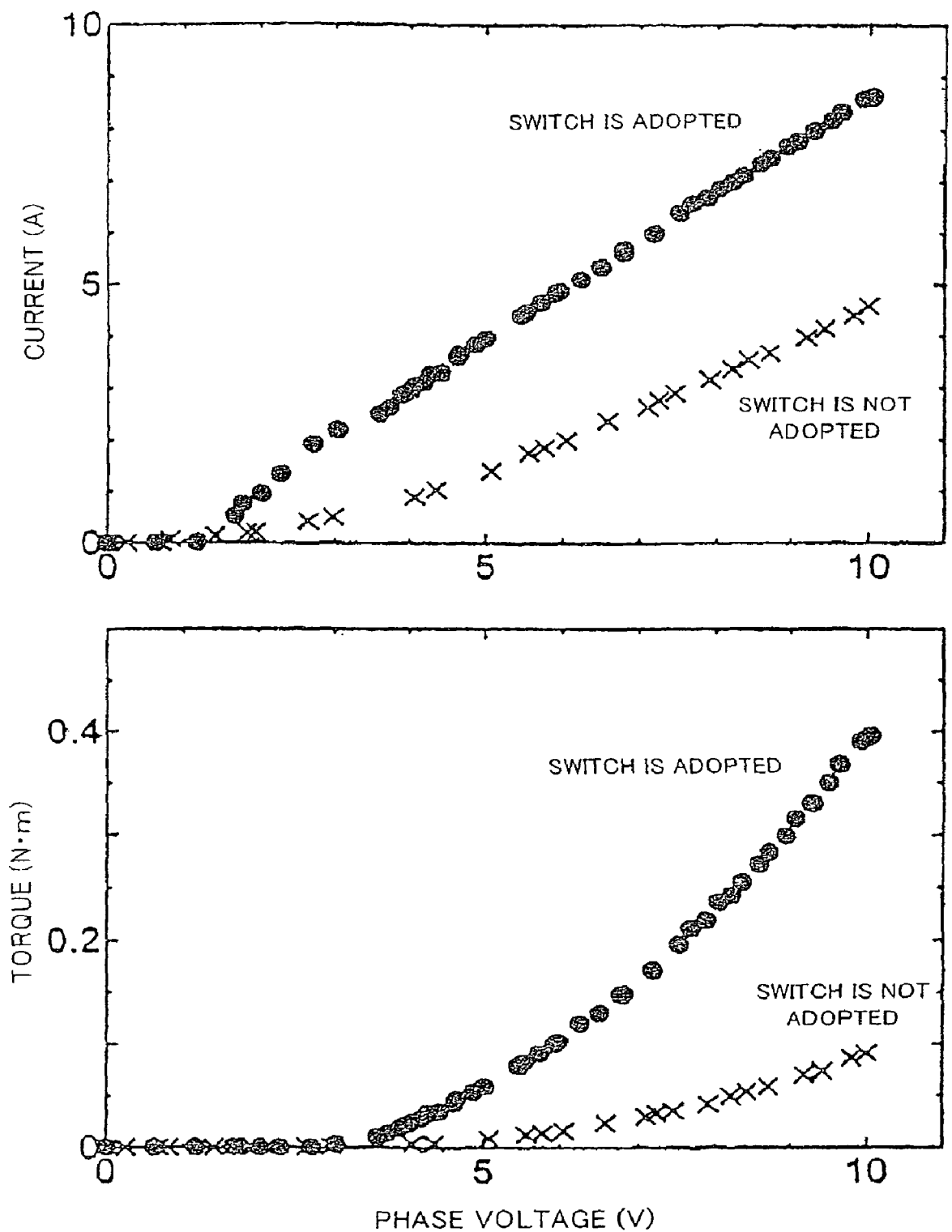
FIG. 4 is a diagram illustrating comparison of an actual measurement value wherein the alternating-current power supply device according to the present invention is connected (with switch) with that wherein it is not connected (without switch) with respect to a starting current of the induction motor and a starting torque of it.

When the alternating-current power supply device of the present invention is used as the power supply of the induction motor, the starting torque at the time of start-up can be increased. FIG. 3 is a diagram illustrating an experimental circuit for actually measuring the starting torque, and FIG. 4 is a graph where the actual measurement value of the starting torque is compared with the starting torque in the case where the conventional alternating-current power supply is used. As is clear from this drawing, in the case where the alternating-current power supply device of the present invention is used, the starting torque which is four times as strong as that in the case of the conventional device can be obtained at the voltage of the same phase.

What is claimed is:

1. An alternating-current power supply device which supplies an alternating current to an induction load and recovers magnetic energy at the time of cutting off an current so as to utilize the magnetic energy as an current to be supplied to the induction load, the alternating-current power supply device comprising:

a bridge circuit composed of four reverse conducting semiconductor switches;

a capacitor that is connected between direct-current terminals of the bridge circuit and stores the magnetic energy at the time of cutting off the current;

an alternating-current voltage source that is connected to the induction load in series and is inserted between alternating-current terminals of the bridge circuit; and a control circuit that gives a control signal to gates of the respective reverse conducting semiconductor switches and controls on/off states of the respective reverse conducting semiconductor switches, wherein the control circuit simultaneously controls the on/off operation of the paired reverse conducting semiconductor switches positioned on a diagonal line of the four reverse conducting semiconductor switches composing the bridge circuit, makes a control so that when one pair of the two pairs is ON, the other pair is OFF, and switches the control signal in synchronization with a voltage of the alternating-current voltage source.

2. An alternating-current power supply device for recovering the magnetic energy according to claim 1, wherein the respective reverse conducting semiconductor switches are any one of power MOS FET, a reverse conducting GTO thyristor, and a unit composed of parallel connection between a diode and a semiconductor switch such as IGBT.

* * * * *